US007117533B1

United States Patent
Libenzi (10) Patent No.: US 7,117,533 B1
(45) Date of Patent: Oct. 3, 2006

(54) SYSTEM AND METHOD FOR PROVIDING DYNAMIC SCREENING OF TRANSIENT MESSAGES IN A DISTRIBUTED COMPUTING ENVIRONMENT

(75) Inventor: Davide Libenzi, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 786 days.

(21) Appl. No.: 10/016,509

(22) Filed: Dec. 10, 2001

Related U.S. Application Data (60) Provisional application No. 60/309,835, filed on Aug. 3, 2001, provisional application No. 60/309,858, filed on Aug. 3, 2001.

(51) Int. Cl.
*G06F 11/30* (2006.01)
(52) U.S. Cl. .................. 726/24; 709/223; 709/224; 709/206; 713/188
(58) Field of Classification Search ........... 709/223, 709/227, 231, 232, 245, 250; 713/201
See application file for complete search history.

(56) References Cited

U.S. PATENT DOCUMENTS

| | | | |
|---|---|---|---|
| 5,724,512 A | 3/1998 | Winterbottom | 709/226 |
| 5,832,208 A * | 11/1998 | Chen et al. | 709/206 |
| 5,889,943 A * | 3/1999 | Ji et al. | 726/22 |
| 6,009,462 A | 12/1999 | Birrell et al. | 709/206 |
| 6,021,510 A | 2/2000 | Nachenberg | 714/38 |
| 6,094,731 A | 7/2000 | Waldin et al. | 714/38 |
| 6,119,231 A * | 9/2000 | Foss et al. | 713/200 |
| 6,216,265 B1 | 4/2001 | Roop et al. | 725/54 |
| 6,226,666 B1 | 5/2001 | Chang et al. | 709/202 |
| 6,321,267 B1* | 11/2001 | Donaldson | 709/229 |
| 6,577,920 B1 | 6/2003 | Hypponen et al. | 700/200 |
| 6,650,890 B1* | 11/2003 | Irlam et al. | 455/412.1 |
| 6,654,787 B1* | 11/2003 | Aronson et al. | 709/206 |
| 6,732,149 B1 | 5/2004 | Kephart | 709/206 |
| 6,745,192 B1 | 6/2004 | Libenzi | 707/100 |
| 6,757,830 B1* | 6/2004 | Tarbotton et al. | 713/188 |
| 6,851,057 B1 | 2/2005 | Nachenberg | 713/200 |
| 6,993,660 B1 | 1/2006 | Libenzi et al. | 713/188 |
| 2001/0034839 A1 | 10/2001 | Karjoth et al. | 713/190 |
| 2002/0016826 A1* | 2/2002 | Johansson et al. | 709/207 |
| 2002/0112008 A1 | 8/2002 | Christenson et al. | 709/206 |
| 2002/0116463 A1* | 8/2002 | Hart | 709/206 |

(Continued)

OTHER PUBLICATIONS

"Virus Information Library," http://vi.mcafee.com; Networks Associates, Inc., 2001.

(Continued)

*Primary Examiner*—Bunjob Jaroenchonwanit
*Assistant Examiner*—Dohm Chankong
(74) *Attorney, Agent, or Firm*—Zilka-Kobab, PC; Christopher J. Hamaty (57) ABSTRACT

A system and method for providing dynamic screening of transient messages in a distributed computing environment is disclosed. An incoming message is intercepted at a network domain boundary. The incoming message includes a header having a plurality of address fields, each storing contents. A set of blocking rules is maintained. Each blocking rule defines readily-discoverable characteristics indicative of messages infected with at least one of a computer virus, malware and bad content. The contents of each address field are identified and checked against the blocking rules to screen infected messages and identify clean messages. Each such clean message is staged into an intermediate message queue pending further processing.

29 Claims, 5 Drawing Sheets

U.S. PATENT DOCUMENTS

| | | | |
|---|---|---|---|
| 2002/0129277 A1* | 9/2002 | Caccavale | 713/201 |
| 2002/0147780 A1* | 10/2002 | Liu et al. | 709/206 |
| 2002/0194490 A1* | 12/2002 | Halperin et al. | 713/200 |
| 2003/0021280 A1* | 1/2003 | Makinson et al. | 370/401 |
| 2003/0088680 A1* | 5/2003 | Nachenberg et al. | 709/229 |
| 2004/0236884 A1 | 11/2004 | Beetz | 710/68 |
| 2005/0188045 A1* | 8/2005 | Katsikas | 709/206 |

OTHER PUBLICATIONS

Stephens W R, "SMTP: Simple Mail Transfer Protocol," *TCP/IP Illustrated: The Protocols*; vol. 1, Ch. 28, pp. 441-459, 1999, Addison-Wesley, USA.

Office Action from U.S. Appl. No. 10/016,533 mailed Jun. 22, 2005.

Office Action from U.S. Appl. No. 10/016,501 mailed Jan. 2, 2004.

* cited by examiner

SYSTEM AND METHOD FOR PROVIDING DYNAMIC SCREENING OF TRANSIENT MESSAGES IN A DISTRIBUTED COMPUTING ENVIRONMENT

CROSS-REFERENCE TO RELATED APPLICATIONS

This patent application is a conversion of U.S. provisional patent applications, Ser. No. 60/309,835, filed Aug. 3, 2001, pending; and Ser. No. 60/309,858, filed Aug. 3, 2001, pending; the priority dates of which are claimed and the disclosures of which are incorporated by reference.

FIELD OF THE INVENTION

The present invention relates in general to dynamic message screening and, in particular, to a system and method for providing dynamic screening of transient messages in a distributed computing environment.

BACKGROUND OF THE INVENTION

Computer viruses, or simply "viruses," are executable programs or procedures, often masquerading as legitimate files, messages or attachments that cause malicious and sometimes destructive results. More precisely, computer viruses include any form of self-replicating computer code which can be stored, disseminated, and directly or indirectly executed by unsuspecting clients. Viruses travel between machines over network connections or via infected media and can be executable code disguised as application programs, functions, macros, electronic mail (email) attachments, images, applets, and even hypertext links.

The earliest computer viruses infected boot sectors and files. Over time, computer viruses became increasingly sophisticated and diversified into various genre, including cavity, cluster, companion, direct action, encrypting, multipartite, mutating, polymorphic, overwriting, self-garbling, and stealth viruses, such as described in "Virus Information Library," http://vil.mcafee.com/default.asp?, Networks Associates Technology, Inc., (2001), the disclosure of which is incorporated by reference. Macro viruses are presently the most popular form of virus. These viruses are written as scripts in macro programming languages, which are often included with email as innocuous-looking attachments.

The problems presented by computer viruses, malware, and other forms of bad content are multiplied within a bounded network domain interfacing to external internetworks through a limited-bandwidth service portal, such as a gateway, bridge or similar routing device. The routing device logically forms a protected enclave within which clients and servers exchange data, including email and other content. All data originating from or being sent to systems outside the network domain must pass through the routing device. Maintaining high throughput at the routing device is paramount to optimal network performance.

Routing devices provide an efficient solution to interfacing an intranetwork of clients and servers to external internetworks. Most routing devices operate as store-and-forward packet routing devices, which can process a high volume of traffic transiting across the network domain boundary. Duplicate messages, however, introduce inefficiencies and can potentially degrade performance. For example, a message can be sent with multiple recipients who each receive a separate copy. Nevertheless, the routing device must process each duplicate message as if the message were unique.

A firewall can be used with a routing device to provide limited security. The firewall filters incoming packets to deny access by unauthorized users. Thus, the firewall can protect indirectly against the introduction of computer viruses and other malware into a network domain. As each duplicate message must still be scanned prior to delivery, a firewall does not relieve packet congestion at a network boundary and can actually degrade throughput by delaying delivery.

The bottleneck created by the routing device and firewall create a security risk that can be exploited in a denial of service (DoS) attack. The "ILOVEYOU" virus, released in May 2000, dramatically demonstrated the vulnerability of network infrastructure components by propagating copies of emails containing the virus using addresses obtained from a user address book on each client system. Each email message contained identical content but listed a different recipient. The resultant email flood saturated servers with massively duplicated copies of substantially the same email and denied service through resource depletion and network bandwidth consumption.

Most firewalls failed to detect the presence of the "ILOVEYOU" virus. Firewalls require a priori knowledge of network addresses corresponding to proscribed servers to effectively filter out potentially bad packets. Therefore, infected emails were delivered and unwittingly opened by unsuspecting users, creating a flood of infected message traffic.

Therefore, there is a need for an approach to efficiently screening a multiplicity of substantially duplicate message packets transiting the boundary of a network domain. Such an approach would preferably check the headers of incoming messages by checking the contents of structured fields for contents indicating the presence of a virus, malware and other forms of bad content.

There is a further need for an approach to screening transient messages at in conjunction with conventional antivirus scanner. Preferably, such an approach recognize readily-discoverable characteristics indicative of an infected message and would decrease the load on the antivirus scanner. Such an approach would further provide pro-active antivirus measures, including packet discarding and early connection closure.

SUMMARY OF THE INVENTION

The present invention provides a system and method for screening incoming message packets at the boundary of a network domain. Each incoming message packet is intercepted and parsed. The contents of each field in the header of an incoming message are matched against blocking rules. The blocking rules screen for readily-discoverable characteristics indicative of an infected message. Screened non-infected messages are enqueued into a message queue for event-based scanning by an antivirus scanner. Infected messages are discarded and the connection to the client from which the message originated is closed.

An embodiment of the present invention provides a system and a method for providing dynamic screening of transient messages in a distributed computing environment. An incoming message is intercepted at a network domain boundary. The incoming message includes a header having a plurality of address fields, each storing contents. A set of blocking rules is maintained. Each blocking rule defines readily-discoverable characteristics indicative of messages infected with at least one of a computer virus, malware and bad content. The contents of each address field are identified and checked against the blocking rules to screen infected messages and identify clean messages. Each such clean message is staged into an intermediate message queue pending further processing.

A further embodiment provides a system and method for efficiently detecting computer viruses and malware at a network domain boundary. An incoming message packet is received from a sending client at a network domain boundary through an open connection. The incoming message packet includes a header including fields, which each store field values. The field values are parsed from each field in the header of each incoming message packet by extracting tokens representing the field values. The tokens are compared to characteristics indicative of at least one of a computer virus and malware to identify screened incoming message packets. Each screened incoming message packet is forwarded.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
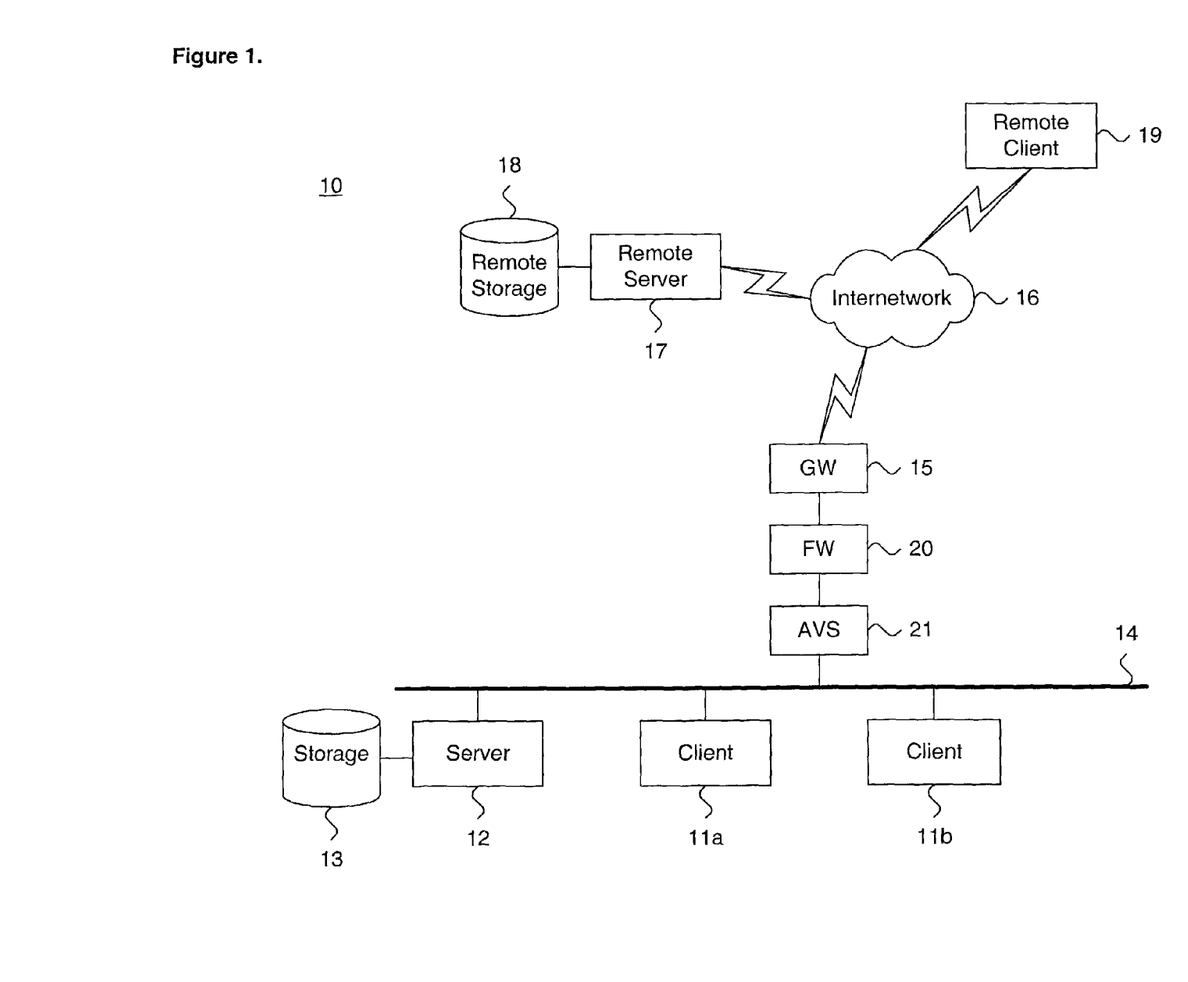
FIG. 1 is a block diagram showing a system for providing dynamic screening of transient messages in a distributed computing environment, in accordance with the present invention.

FIG. 1 is a block diagram showing a system for providing dynamic screening of transient messages in a distributed computing environment 10, in accordance with the present invention. By way of example, a gateway 15 (or bridge, router, or similar packet routing device) interfaces an intranetwork 14 to an internetwork 16, including the Internet. The intranetwork 14 interconnects one or more servers 12 with one or more clients 11a–b within a bounded network domain defined by a common network address space. The server 12 includes a storage device 13 for common file storage and sharing. The clients 11a–b can also include storage devices (not shown).

The individual servers 12 and clients 11a–b externally connect to one or more remote servers 17 and remote clients 19 over the internetwork 16 via the gateway 15. The gateway 15 operates as a store-and-forward packet routing device, which processes a high volume of packet traffic transiting across the network domain boundary. The gateway 15 provides an efficient solution to interfacing the individual servers 12 and clients 11a–b to external systems operating over the internetwork 16. Optionally, a firewall 20 can provide limited security to the intranetwork 14 by providing filtering of packets originating from unauthorized users. Other network topologies and configurations are feasible, as would be recognized by one skilled in the art.

In addition to the firewall 20, an antivirus system (AVS) 21 actively analyzes message packets incoming to the bounded network domain for the presence of computer viruses and provides dynamic screening of transient messages, as further described below with reference to FIG. 2. Each component in the distributed computing environment 10 executes a layered network protocol stack for processing different types of packets, including electronic mail (email) exchanged in accordance with the Simple Mail Transport Protocol (SMTP). In the described embodiment, the system and method are implemented in the Web Shield E500 ASAP active security antivirus product, Version 1.0, licensed by Network Associates, Inc., Santa Clara, Calif.

The individual computer systems, including servers 12, 17 and clients 11a–b, 19 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
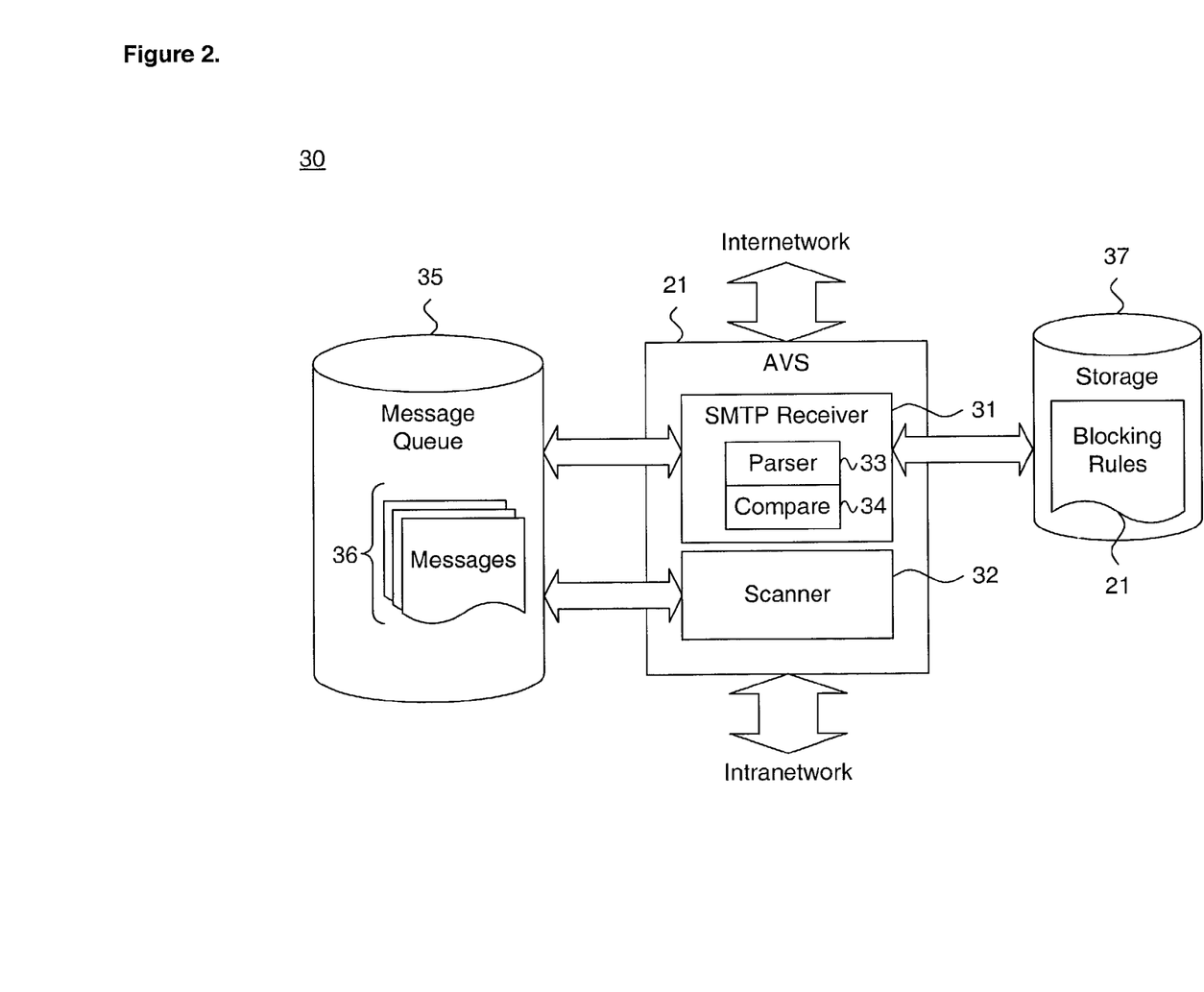
FIG. 2 is a functional block diagram showing the software modules of the antivirus system of FIG. 1.

FIG. 2 is a functional block diagram showing the software modules 30 of the antivirus system 21 of FIG. 1. The antivirus system 21 includes two functionally separate modules: SMTP receiver 31 and antivirus scanner 32. The SMTP receiver 31 intercepts and screens transient message packets, preferably exchanged in compliance with the SMTP protocol, such as described in W. R. Stevens, "TCP/IP Illustrated, Vol. 1, The Protocols," Ch. 28, Addison Wesley Longman, Inc. (1994), the disclosure of which is incorporated by reference. The fields in each message packet header are screened for indications that the accompanying contents of the message contain a virus, malware or other form of bad content. Only screened "clean" messages 36 are forwarded on the antivirus scanner 32.

The SMTP receiver 31 and antivirus scanner 32 are functionally separate modules. The SMTP receiver 31 operates on the contents of message header fields. The antivirus scanner 32 operates on the actual contents of the message body and any attachments, including embedded attachments. The antivirus scanner 32 retrieves each screened message from a message queue 35 for scanning using standard antivirus techniques, as are known in the art. As well, in a further embodiment, the antivirus scanner 32 works closely in conjunction with the SMTP receiver 31, which stores an infection marker, in the form of a checksum, associated with specific message content identified as containing a virus, malware or other form of bad content, such as described in commonly-assigned related U.S. patent application Ser. No. 10/016,533, entitled "System And Method For Performing Efficient Computer Virus Scanning Of Transient Messages Using Checksums In A Distributed Computing Environment," filed Dec. 10, 2001, pending, the disclosure of which is incorporated by reference.

The antivirus scanner 32 operates in an event-based manner by processing screened messages fed into the message queue 35 by the SMTP receiver 31. The message queue 35 functions as an event-handler by creating a logical connection between the SMTP receiver 31 and antivirus scanner 32. The message queue 35 provides an intermediate store in which screened messages 38 are staged. In the described embodiment, the screened messages 38 are efficiently staged in a hierarchical message store implementing a portable message referencing scheme, such as described in commonly-assigned related U.S. patent application Ser. No. 10/016,501, entitled "System And Method For Providing A Multi-Tiered Hierarchical Transient Message Store Accessed Using Multiply Hashed Unique Filenames," filed Dec. 10, 2001, pending, the disclosure of which is incorporated by reference.

The antivirus scanner 32 can fall behind in processing if the message queue 35 becomes saturated with screened messages 36. Consequently, the antivirus system 21 will hinder packet throughput and create a bottleneck into the network domain. As the SMTP receiver 31 can process transient messages at a higher rate than the antivirus scanner 32, the SMTP receiver 31 maintains the message queue 35 at a constant size in pace with the antivirus scanner 32 and prevents the message queue 35 from becoming saturated by screened messages 36 awaiting scanning.

Incoming transient messages are received from the internetwork 16. The SMTP receiver 31 includes two modules: parser module 33 and compare 34. The parser module 33 interprets the headers of each transient message. The compare module 34 checks the contents of each header field by applying the blocking rules 27 to each transient message. The blocking rules 27 are stored in a storage device 37 coupled to or incorporated within the antivirus system 21. Those messages matching a blocking rule 27 are proactively blocked from entering the message queue 35 as soon as detected and before the entire message is received. To ensure earliest rejection of any incoming messages potentially containing a virus, malware or other form of bad content, the parser module 33 discards each blocked message as soon as a blocking rule is matched to avoid saturating the message queue 35, rather than awaiting receipt of the entire message. The decision to block messages is based on security policy rules implemented into the blocking rules 27. In the described embodiment, the blocking rules 27 are implemented as regular expressions, although other forms of blocking rule could be used, as would be recognized by one skilled in the art.

Each module, including SMTP receiver 31 and antivirus scanner 32, is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The modules operates in accordance with a sequence of process steps, as further described below with reference to FIG. 4.

Figure 3:
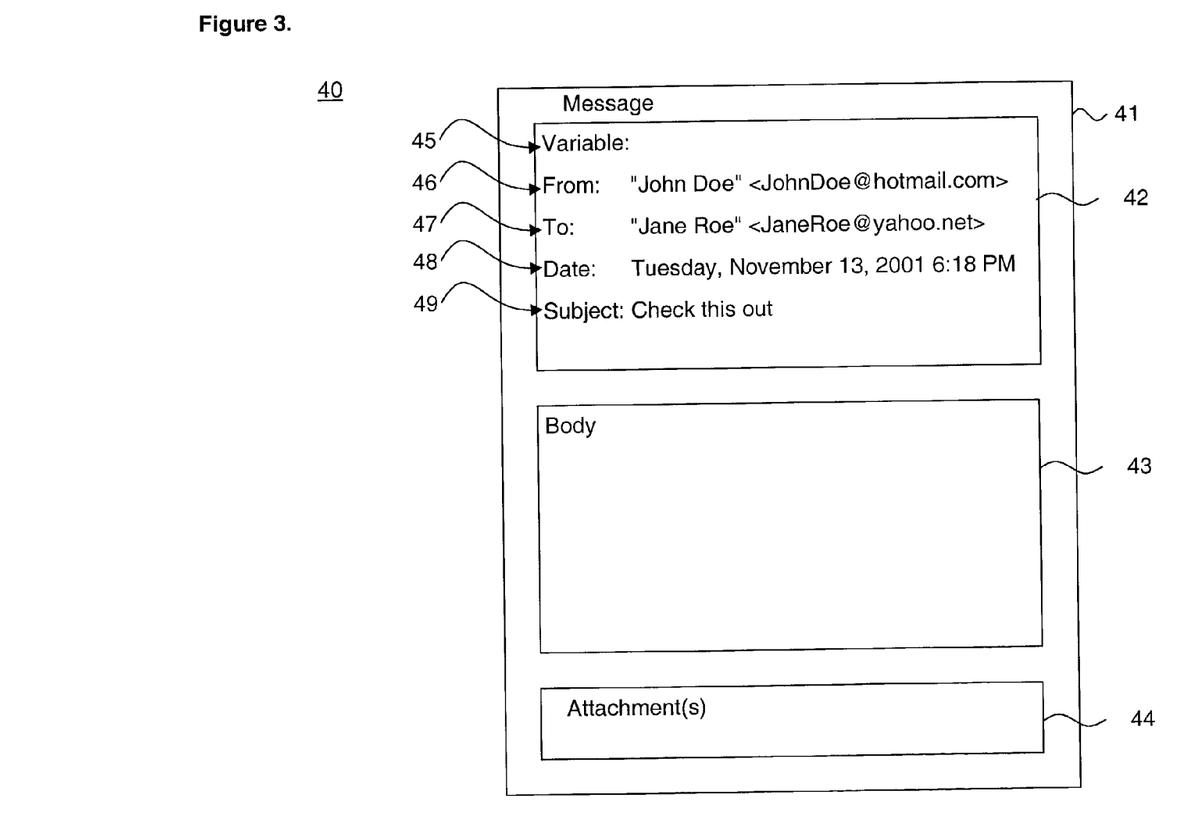
FIG. 3 is a data structure diagram showing, by way of example, the logical layout of a Simple Mail Transfer Protocol (SMTP) message for processing by the antivirus system of FIG. 1.

FIG. 3 is a data structure diagram showing, by way of example, the logical layout 40 of a Simple Mail Transfer Protocol (SMTP) message 41 for processing by the antivirus system 21 of FIG. 1. Note that while transient messages are exchanged using SMTP, the content of each message is formatted according to the Multipurpose Internet Mail Extensions (MIME) standard. Accordingly, each message 41 includes two mandatory sections, a header 42 and body 43, plus one or more optional attachments 44, including embedded attachments (not shown). Each header 42 includes several structured fields, including Variable field 45, From field 46, To field 47, Date field 48, and Subject field 49. Other fields are possible, as would be recognized by one skilled in the art. The foregoing list of fields 45–49 is merely illustrative for purposes of describing the operations performed by the parser module 33 (shown in FIG. 2).

As each incoming SMTP message 41 is received, the individual fields 45–49 are parsed by the parser module 33, which will block the message 41 from entering the message queue 35 if a blocking rule 37 is matched. For example, a blocking rule 37 could be implemented to block any message 41 having a Subject field 49 containing the string, "Check this out." The parser module 33 would match the contents of the Subject field 49 to the blocking rule 27 for the string "Check this out." Upon matching, the message 41 would be blocked from the message queue 35 and would therefore not be scanned by the antivirus scanner 32, thereby alleviating the load on the antivirus scanner 32 and the individual servers 12 and clients 11a–b (shown in FIG. 1). The blocked message is discarded and the connection to the client from which the messaged originated is closed.

In the described embodiment, each blocking rule is implemented as a regular expression. The contents of each field is parsed and tokens are extracted and analyzed by the parser module 33. Each regular expression is applied against the tokenized fields and can include literal and "wildcard" values, as are known in the art. The use of regular expression allow for flexible and efficient message screening. Other forms of blocking rules could also be used either in lieu of or in conjunction with regular expression-based blocking rules, as would be recognized by one skilled in the art.

Figure 4:
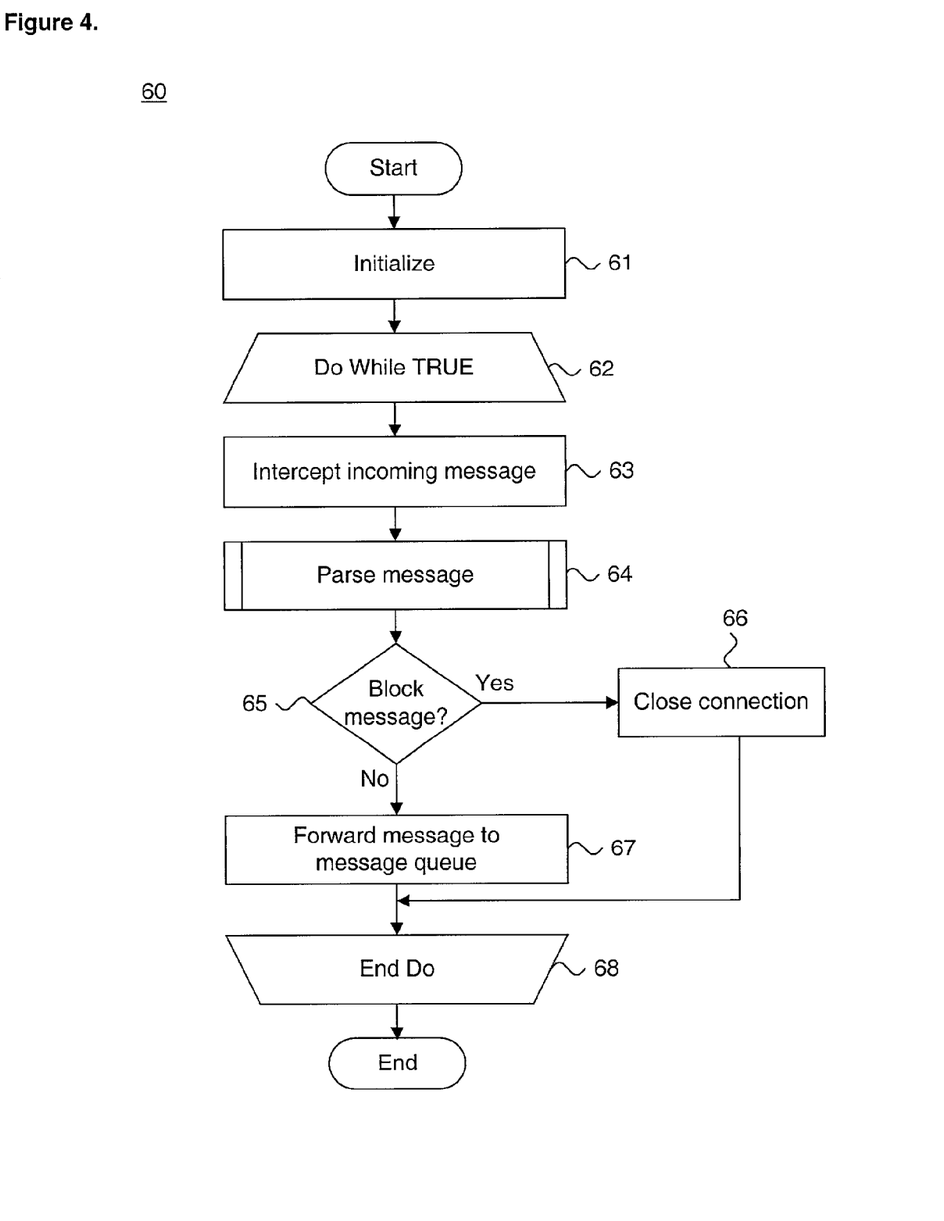
FIG. 4 is a flow diagram showing a method for providing dynamic screening of transient messages in a distributed computing environment, in accordance with the present invention.

FIG. 4 is a flow diagram showing a method 60 for providing dynamic screening of transient messages in a distributed computing environment, in accordance with the present invention. Briefly, each field 45–49 (shown in FIG. 3) of a message header 42 is parsed by the parser module 33 (shown in FIG. 2), which applies the blocking rules 27 to screen for indications that the accompanying contents of the message contain a virus, malware or other form of bad content.

First, the parser module 33 is initialized (block 61) to load the blocking rules 27 and initialize internal data structures. Incoming transient messages are iteratively intercepted and parsed (blocks 62–68), as follows. During each iteration (block 62), an incoming message 41 is intercepted (block 63) at a network domain boundary. Each header field 45–49 of the message 41 is parsed (block 64) to block suspect messages, as further described below with reference to FIG. 5. If the message 41 is blocked (block 65), the connection to the client from which the blocked messaged originated is closed and the blocked message discarded (block 66). Otherwise, the screened message is forwarded to the message queue 35 (block 67) for scanning by the antivirus scanner 32. Processing continues for each incoming message 41 (block 68), until the method ends or is terminated.

Figure 5:
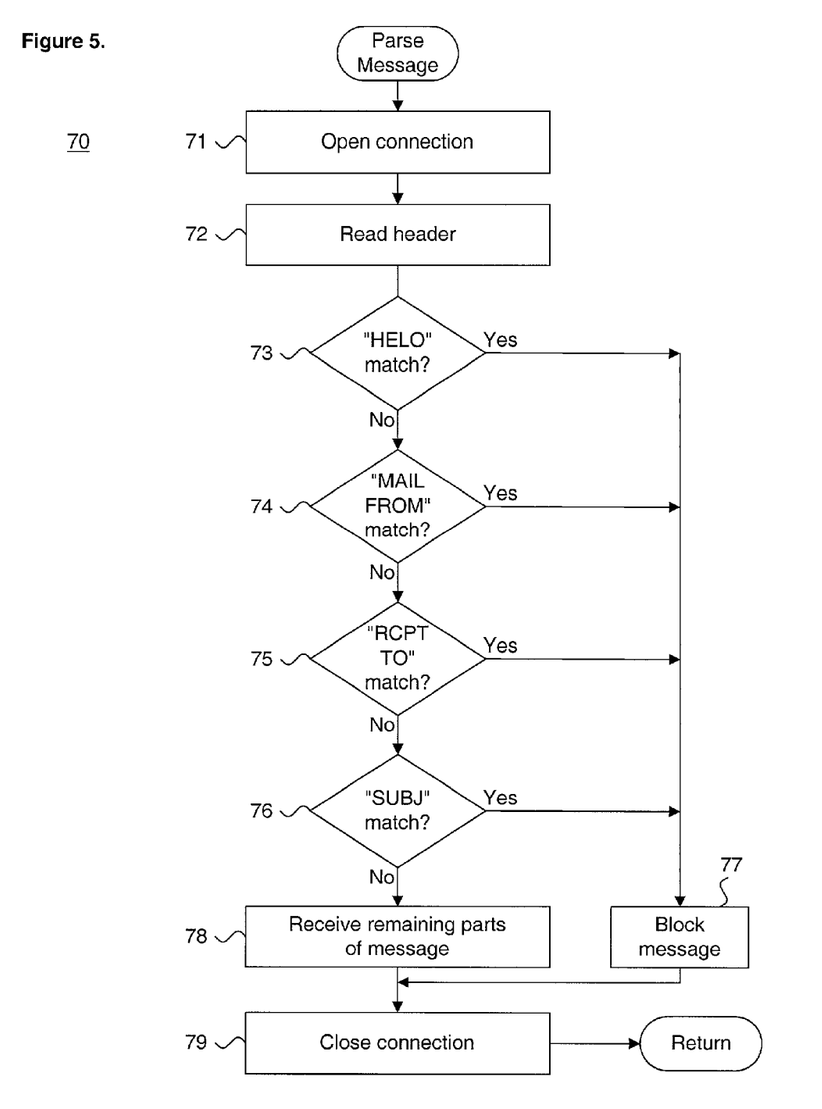
FIG. 5 is a flow diagram showing the routine for parsing a message for use in the method of FIG. 4.

FIG. 5 is a flow diagram showing the routine 70 for parsing a message for use in the method 60 of FIG. 4. The purpose of this routine is to dynamically parse the contents of the structured fields contained in the header of each transient message 41.

Each field 45–49 of the message header 42 (shown in FIG. 3) is screened for validity. First, a connection is opened (block 71) with a client requesting the delivery of a message 41. By way of example, a sample SMTP dialog for an incoming message 41 might be as follows:

| | |
|---|---|
| c> | HELO domain |
| s> | 250 abc.com |
| c> | MAIL FROM: John_Doe@hotmail.com |
| s> | 250 OK |
| c> | RCPT TO: Jane_Roe@yahoo.com |
| s> | 250 OK |
| c> | DATA |
| s> | 354 GO AHEAD | where c> is a client dialogue and s> is a server reply. The message dialog indicates an incoming SMTP message 41 from "JohnDoe@hotmail.com" being sent to "JaneDoe@yahoo.net" via a server at "abc.com." The SMTP receiver 31 begins receiving the contents of the actual incoming SMTP message 41 following the "354 GO AHEAD."

Each field 45–49 is received and validated (blocks 73–76) against the blocking rules 27 (shown in FIG. 2). A match between the contents of any of the fields causes the incoming message 41 to be blocked (block 77) and the connection to be closed (block 79). To ensure earliest rejection of any incoming messages potentially containing a virus, malware or other form of bad content, the parser module 33 discards each blocked message as soon as a blocking rule is matched, rather than awaiting receipt of the entire message. Accordingly, saturation of the message queue 35 is avoided.

Otherwise, if the incoming message 41 is valid and not blocked (blocks 73–76), the remaining parts of the incoming message 41 are received (block 78) and the connection is closed (block 79). The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing dynamic screening of transient messages in a distributed computing environment, comprising:
   an antivirus system intercepting an incoming message at a network domain boundary, the incoming message including a header comprising a plurality of address fields storing contents;
   a stored set of blocking rules, each blocking rule defining readily-discoverable characteristics indicative of messages infected with at least one of a computer virus, malware and bad content;
   a parser module identifying the contents of each address field;
   a comparison module checking the contents of each address field against the blocking rules to screen infected messages and identify clean messages;
   an intermediate message queue staging each such clean message pending further processing;
   an antivirus scanner scanning each message in the intermediate message queue for at least one of a computer virus and malware; and
   an event handler performing each scanning operation as an event responsive to each such clean message staged in the intermediate message queue;
   wherein the infected messages are blocked from entering the intermediate message queue immediately after the comparison is made between the blocking rules and the contents of at least one of the address fields;
   wherein the intermediate message queue is maintained at a constant size;
   wherein the constant size is determined according to a progress of the antivirus scanner in order to prevent the intermediate message queue from becoming overloaded with messages awaiting scanning.

2. A system according to claim 1, further comprising:
   a message receiver discarding each such infected message without further processing.

3. A system according to claim 1, wherein each such blocking rule is specified as a regular expression containing at least one of literal and wildcard values.

4. A system according to claim 1, further comprising:
   a gateway receiving the incoming messages into the network domain boundary.

5. A system according to claim 1, wherein the structured fields comprise at least one of sender, recipient, copied recipient, blind copied recipient, date, time, and subject.

6. A system according to claim 1, wherein the incoming message comprises at least one attachment.

7. A system according to claim 1, wherein the distributed computing environment is TCP/IP-compliant and each incoming message is SMTP-compliant.

8. A method for providing dynamic screening of transient messages in a distributed computing environment, comprising:
   intercepting an incoming message at a network domain boundary, the incoming message including a header comprising a plurality of address fields storing contents;
   maintaining a set of blocking rules, each blocking rule defining readily-discoverable characteristics indicative of messages infected with at least one of a computer virus, malware and bad content;
   identifying and checking the contents of each address field against the blocking rules to screen infected messages and identify clean messages;
   staging each such clean message into an intermediate message queue pending further processing;
   scanning each message in the intermediate message queue for at least one of a computer virus and malware; and
   performing each scanning operation as an event responsive to each such clean message staged in the intermediate message queue;
   wherein the infected messages are blocked from entering the intermediate message queue immediately after the comparison is made between the blocking rules and the contents of at least one of the address fields;
   wherein the intermediate message queue is maintained at a constant size;
   wherein the constant size is determined according to a progress of an antivirus scanner in order to prevent the intermediate message queue from becoming overloaded with messages awaiting scanning.

9. A method according to claim 8, further comprising:
   discarding each such infected message without, further processing.

10. A method according to claim 8, further comprising:
    specifying each such blocking rule as a regular expression containing at least one of literal and wildcard values.

11. A method according to claim 8, further comprising:
    receiving the incoming messages at a gateway into the network domain boundary.

12. A method according to claim 8, wherein the structured fields comprise at least one of sender, recipient, copied recipient, blind copied recipient, date, time, and subject.

13. A method according to claim 8, wherein the incoming message comprises at least one attachment.

14. A method according to claim 8, wherein the distributed computing environment is TCP/IP-compliant and each incoming message is SMTP-compliant.

15. A computer-readable storage medium holding code for performing the method according to claims 8, 9, 10, 11, 12, 13, or 14.

16. A system for efficiently detecting computer viruses and malware at a network domain boundary, comprising:
an antivirus system receiving an incoming message packet from a sending client at a network domain boundary through an open connection, the incoming message packet comprising a header including fields, which each store field values, wherein each incoming message packet further comprises a body storing message content;
a message receiver comprising:
a parser module parsing the field values from each field in the header of each incoming message packet by extracting tokens representing the field values;
a comparison module comparing the tokens to characteristics indicative of at least one of a computer virus and malware to identify screened incoming message packets, and forwarding each screened incoming message packet;
a message queue enqueueing each screened incoming message packet; and
an antivirus scanner scanning the message content of the body of each screened incoming message packet for at least one of a computer virus and malware to identify uninfected screened incoming message packets, and forwarding each uninfected screened incoming message packet;
wherein the screened incoming message packets determined to be infected are blocked from being forwarded immediately after the comparison is made between the tokens and the characteristics indicative of at least one of a computer virus and malware;
wherein the message queue is maintained at a constant size;
wherein the constant size is determined according to a progress of the antivirus scanner in order to prevent the message queue from becoming overloaded with messages awaiting scanning.

17. A system according to claim 16, wherein the antivirus system closes the open connection to the sending client of each non-screened incoming message packet.

18. A system according to claim 16, wherein the comparison module analyzes at least one of a sender, recipient, copied recipient, blind copied recipient, date, time, and subject field in the header of each incoming message packet.

19. A system according to claim 16, wherein the comparison module applies blocking rules to the field values of the header of each incoming message packet.

20. A system according to claim 16, wherein the distributed computing environment is TCP/IP-compliant and each incoming message packet is SMTP-compliant.

21. A method for efficiently detecting computer viruses and malware at a network domain boundary, comprising:
receiving an incoming message packet from a sending client at a network domain boundary through an open connection, the incoming message packet comprising a header including fields, which each store field values, wherein each incoming message packet further comprises a body storing message content;
parsing the field values from each field in the header of each incoming message packet by extracting tokens representing the field values;
comparing the tokens to characteristics indicative of at least one of a computer virus and malware to identify screened incoming message packets;
forwarding each screened incoming message packet;
scanning the message content of the body of each screened incoming message packet for at least one of a computer virus and malware to identify uninfected screened incoming message packets;
forwarding each uninfected screened incoming message packet; and
enqueueing each screened incoming message packet onto a message queue;
wherein the screened incoming message packets determined to be infected are blocked from being forwarded immediately after the comparison is made between the tokens and the characteristics indicative of at least one of a computer virus and malware;
wherein the intermediate message queue is maintained at a constant size;
wherein the constant size is determined according to a progress of an antivirus scanner in order to prevent the intermediate message queue from becoming overloaded with messages awaiting scanning.

22. A method according to claim 21, further comprising:
closing the open connection to the sending client of each non-screened incoming message packet.

23. A method according to claim 21, further comprising:
analyzing at least one of a sender, recipient, copied recipient, blind copied recipient, date, time, and subject field in the header of each incoming message packet.

24. A method according to claim 21, further comprising:
applying blocking rules to the field values of the header of each incoming message packet.

25. A method according to claim 21, wherein the distributed computing environment is TCP/IP-compliant and each incoming message packet is SMTP-compliant.

26. A computer-readable storage medium holding code for performing the method according to claims 21, 22, 23, 24, or 25.

27. The system according to claim 1, wherein the antivirus scanner scans content of a body of the message and any attachments.

28. The system according to claim 1, wherein the infected messages are discarded immediately after being blocked from entering the intermediate message queue.

29. The system according to claim 1, wherein a connection to a sender of the incoming message is closed if the message is blocked.

* * * * *

UNITED STATES PATENT AND TRADEMARK OFFICE
CERTIFICATE OF CORRECTION

| | | |
|---|---|---|
| PATENT NO. | : 7,117,533 B1 | Page 1 of 1 |
| APPLICATION NO. | : 10/016509 | |
| DATED | : October 3, 2006 | |
| INVENTOR(S) | : Libenzi | |

It is certified that error appears in the above-identified patent and that said Letters Patent is hereby corrected as shown below:

On the Title Page:
Item 74, Attorney, Agent, or Firm replace "Kobab" with --Kotab--.

Signed and Sealed this

Twelfth Day of October, 2010

David J. Kappos
*Director of the United States Patent and Trademark Office*